United States Patent Office 3,634,550
Patented Jan. 11, 1972

3,634,550
MOLDING COMPOUNDS OF POSTCHLORINATED POLYVINYL CHLORIDE AND ETHYLENE/ VINYL ACETATE COPOLYMER
Bernhard Kraemer, Oberlar, Germany, assignor to Dynamit Nobel Aktiengesellschaft, Troisdorf, Germany
No Drawing. Continuation of application Ser. No. 430,774, Feb. 5, 1965. This application Apr. 17, 1968, Ser. No. 722,132
Claims priority, application Germany, Feb. 13, 1964, D 43,619
Int. Cl. C08f 29/24, 29/12
U.S. Cl. 260—897 C                  7 Claims

ABSTRACT OF THE DISCLOSURE

A postchlorinated polyvinychloride plastic molding composition, containing, as a modifying agent which improves workability of the molding composition, copolymer of vinyl acetate and ethylene.

---

This application is a continuation of application Ser. No. 430,774 filed Feb. 5, 1965, now abandoned.

It is known that it is possible by the postchlorination of polyvinyl chloride to increase considerably the thermal stability of the product over that of PVC (polyvinyl chloride), but that the products are, at the same time, very brittle and difficult to work. Consequently, the use of postchlorinated PVC as a plastic in industry has been limited to a very few fields.

The subject of the invention is molding compositions on a basis of postchlorinated PVC, which are characterized by the addition of about 2–20 wt. percent, based on the weight of the molding composition, of a copolymer of vinyl acetate and ethylene, which contains about 10–65 wt. percent, and preferably about 28–45 wt. percent, based on the weight of the copolymer, of vinyl acetate.

Impact toughness and U-notch toughness are very considerably improved by use of these modifying agents, without substantially reducing the high thermal stability as is the case with other prior art modifications of PVC.

The improvement of the notch toughness increases as the ethylene content increases, while the workability, however, simultaneously becomes poorer. The addition of about 5–10 wt. percent of the copolymer to the postchlorinated PVC will suffice to achieve a clearly evident improvement of the notch toughness. When the copolymer is added in graft polymer form, however, the workability is substantially improved. This is also the case when about 5–50 wt. percent, and preferably about 20–25 wt. percent of PVC, based on the weight of the molding composition, is added as a third component.

EXAMPLE 1

A suspension PVC, postchlorinated in a conventional manner and treated with the customary amounts of stabilizer, and having a K number of 68 and a chlorine content of 66.2 wt. percent, is mixed with 5, 10, 15 and 20 wt. percent of a copolymer of vinyl acetate and ethylene with a vinyl acetate content of 45 wt. percent, and drawn in a rolling mill into sheets. These rolled sheets are pressed to a thickness of 4 mm., and the impact strength and notch-impact toughness are measured on specimens taken therefrom.

TABLE 1

| | | | | | |
|---|---|---|---|---|---|
| Postchlorinated PVC K number 68, wt. percent (chlorine content 66.2 wt. percent) | 100 | 95 | 90 | 85 | 80 |
| Copolymer 45 wt. percent vinyl acetate content, wt. percent | 0 | 5 | 10 | 15 | 20 |
| Impact toughness (5 specimens in each case) cm. kp./cm.² DIN 53,453: | | | | | |
| 20° | (¹) | (¹) | (¹) | (¹) | (¹) |
| 0° | ¹2×43.5 | (¹) | (¹) | (¹) | (¹) |
| −20° | 35.8 | ¹1×87.0 | ¹2×63.4 | (¹) | ¹4×76.2 |
| Notch toughness (5 specimens in each case) cm. kp./cm.²: | | | | | |
| 20° | 4.0 | 4.8 | 4.9 | 5.4 | 4.8 |
| 0° | 4.1 | 4.4 | 4.3 | 4.2 | 4.6 |
| −20° | 4.0 | 4.0 | 3.9 | 4.2 | 4.2 |

¹ Not broken.

EXAMPLE 2

10 wt. percent of a copolymer of vinyl acetate and ethylene with an acetate content that varied as is indicated in the table below, was worked into the same postchlorinated PVC as in Example 1 and the impact toughness and notch toughness were determined on pressed sheet specimens 4 mm. thick.

TABLE 2

| | | | | | |
|---|---|---|---|---|---|
| Postchlorinated PVC K number 68 wt. percent (chlorine content 66.2 wt percent) | 100 | 90 | 90 | 90 | 90 |
| Vinyl acetate content in the copolymer, wt. percent | 0 | 28 | 30 | 45 | 65 |
| Impact toughness (5 specimens in each case) cm. kp./cm.² DIN 53453: | | | | | |
| 20° | (¹) | (¹) | (¹) | (¹) | (¹) |
| 0° | ¹2×43.5 | (¹) | (¹) | (¹) | (¹) |
| −20° | 35.8 | ¹4×128 | ¹4×81 | ¹2×63 | ¹1×58 |
| Notch toughness (5 specimens in each case) cm. kp./cm.² DIN 53453: | | | | | |
| 20° | 4.0 | 20.9 | 23.4 | 4.9 | 3.8 |
| 0° | 4.1 | 18.0 | 17.3 | 4.3 | 3.5 |
| −20° | 4.0 | 13.6 | 9.1 | 3.9 | 3.3 |

¹ Not broken.

All percentages are weight percent unless otherwise indicated.

What is claimed is:

1. A plastic molding composition workable into sheets by rolling consisting essentially of postchlorinated polyvinylchloride and as a modifying agent copolymer of vinyl acetate and ethylene containing about 10–65 wt. percent of vinyl acetate, in an amount sufficient to increase the impact toughness.

2. A plastic molding composition as in claim 1, the modifying agent being about 2–20 wt. percent of the composition.

3. A plastic molding composition as in claim 1, the copolymer of vinylacetate and ethylene in said modifying agent containing about 28–45 wt. percent of vinyl acetate.

4. A plastic molding composition as in claim 1, containing in addition to the aforementioned components about 5–50 wt. percent polyvinylchloride.

5. A plastic molding composition as in claim 2, containing in addition to the aforementioned components about 5–50 wt. percent polyvinylchloride.

6. A plastic molding composition according to claim 1, the postchlorinated polyvinyl chloride having a K value of about 66–68 and a chlorine content of about 66.2–67.4 wt. percent.

7. Compositions having improved impact strength, constituted of a mixture of postchlorinated polyvinyl chloride containing 662–674 grams of chlorine per kilogram of postchlorinated polyvinyl chloride with from 2 to 20% by weight of an ethylene-vinyl acetate copolymer containing 10–65% by weight of vinyl acetate.

References Cited

UNITED STATES PATENTS

| | | |
|---|---|---|
| 3,125,545 | 3/1964 | Van Cleve et al. |
| 3,167,535 | 1/1965 | Gateff et al. |
| 3,358,054 | 12/1967 | Hardt et al. _____ 260—878 |

MURRAY TILLMAN, Primary Examiner

C. J. SECCURO, Assistant Examiner

U.S. Cl. X.R.

260—899

PO-1050
(5/69)

UNITED STATES PATENT OFFICE
CERTIFICATE OF CORRECTION

Patent No. 3,634,550     Dated Jan. 11, 1972

Inventor(s) Bernhard Kraemer

It is certified that error appears in the above-identified patent and that said Letters Patent are hereby corrected as shown below:

Col. 2, lines 4 and 5 cancel "When the polymer is added in graft polymer form, however, the workability is substantially improved."

Signed and sealed this 6th day of June 1972.

(SEAL)
Attest:

EDWARD M. FLETCHER, JR.
Attesting Officer

ROBERT GOTTSCHALK
Commissioner of Patents